United States Patent

[11] 3,630,586

| [72] | Inventor | Alfred Pitner<br>Paris, France |
|---|---|---|
| [21] | Appl. No. | 10,229 |
| [22] | Filed | Feb. 10, 1970 |
| [45] | Patented | Dec. 28, 1971 |
| [73] | Assignee | Nedella Rueil<br>Malmaison, France |
| [32] | Priority | Mar. 14, 1969 |
| [33] | | France |
| [31] | | 6907276 |

[54] CLEARANCE-FREE NEEDLE BEARING
15 Claims, 6 Drawing Figs.

| [52] | U.S. Cl. | 308/184 |
|---|---|---|
| [51] | Int. Cl. | F16c 27/04 |
| [50] | Field of Search | 308/184,<br>212, 213, 216 |

[56] References Cited
FOREIGN PATENTS
1,507,257   11/1967   France .......................... 308/184

*Primary Examiner*—Martin P. Schwadron
*Assistant Examiner*—Frank Susko
*Attorney*—Burns, Lobato & Zelnick

ABSTRACT: Needle bearing one of the raceways of which is formed on a thin ring. The latter comprises angularly spaced zones which are subjected to an elastic radially inward deformation by application of these zones on supports afforded by a sleeve concentric with the ring. This sleeve is mounted in the bore of the bearing housing. The sleeve has at least one rigid support in the form of a pressure dished portion bearing on the bore, and at least one elastically yieldable support constituted by an arcuate element show whose radius of curvature exceeds that the ring and that of the bore and which bears at its ends against said bore. The arcuate element is urged radially at its crest into contact with the ring.

PATENTED DEC 28 1971 3,630,586
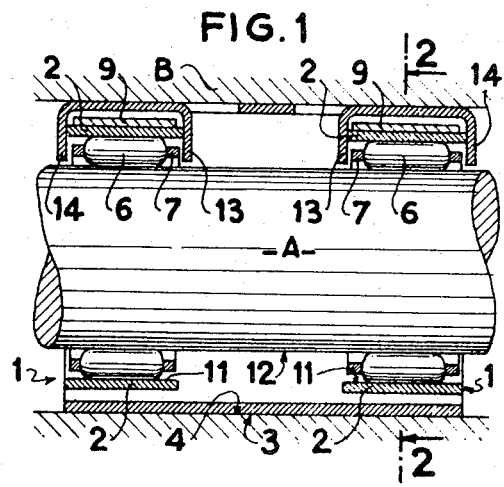
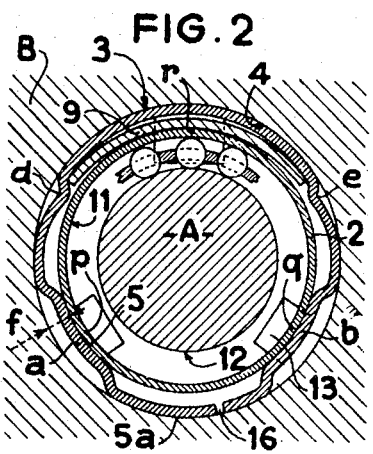
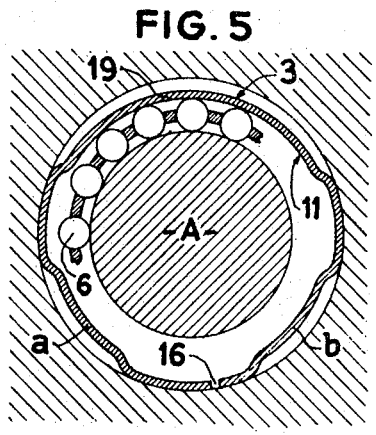
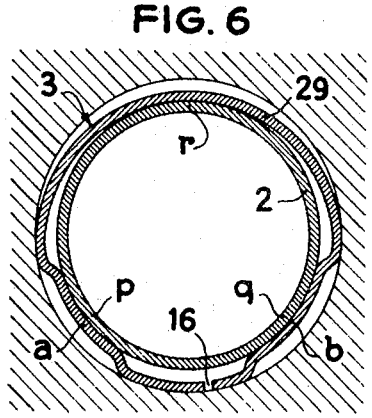
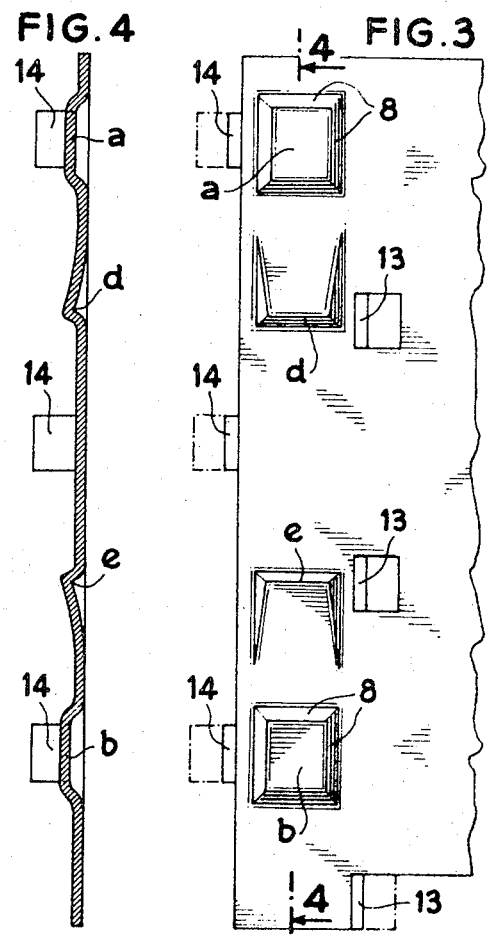

CLEARANCE-FREE NEEDLE BEARING

The present invention relates to needle or roller bearings one of the raceways of which is formed on a thin ring comprising angularly spaced zones which are subjected to a radial elastically yieldable deformation in a direction tending to reduce the clearance for the circulation of the needles owing to the application of said zones on supports afforded by a sleeve concentric with the ring and mounted in the bore of the bearing support.

Such an arrangement is described in French Pat. No. 1,507,257 which also teaches making all of the supports elastically yieldable so that the deformed zones of the ring have their own elasticity and that the needles can, in passing therethrough, apply to said zones an elastic deformation in an opposite direction whereby the stresses to which the needles are subjected remain small.

The present invention differs from this particular arrangement and has for object to provide a bearing whose radial clearance is small or nil or has a negative value and which has a remarkably small overall radial size and is particularly cheap owing to the utilization of mechanical parts produced in a simple manner with manufacturing tolerances which are unusually wide in the bearing industry.

The invention provides a bearing wherein the sleeve, which has a thin wall, comprises at least one rigid support constituted by a pressed dished portion which bears on the bore, and at least one elastically yieldable support constituted by an element in the shape of an arc whose radius of curvature exceeds that of the ring and that of the bore and which bears by its two ends on said bore and is radially urged at its crest into contact with the ring.

The sleeve is preferably made from rolled metal, such as sheet or strip metal, or alternatively is a thin drawn tube. According to this method and in order to practically eliminate the tolerances in the thickness of the metal stock employed, for example in the case of sheet metal, there is achieved, by the design of the tool producing the pressing or pressings, a substantially constant height between the general diameter of the outer face of the sleeve and the inner face of the latter in the region of the pressing, the dimension, normally termed the depth of the pressing, being deliberately uncontrolled since it will absorb or accommodate the tolerances in the thickness of the material employed.

A bearing thus arranged can be employed alone or in the form of a pair of bearings, for example in electric apparatus where there is a free radial force on the bearing but where the position of the shaft must be determined with high and lasting precision relative to the rest of the apparatus owing to the requirements of electrical efficiency (airgap) or to the switch or contact control angular positioning, the precision of such a positioning depending in fact on the absence of substantial radial clearance. Such an apparatus can be a contact maker for an explosion engine.

The element forming the elastically yieldable support can consist of one of the parts of the wall of the sleeve which is shaped for this purpose or of a spring separate from the sleeve and applied by its ends on projections formed in the wall of the sleeve. In giving such a spring strip rather high characteristics of elasticity, and, in particular, in developing its circumferential length, there will be obtained prestressed conditions of the moving elements of the bearing in support zones, defined by the pressing or pressings and by the active part of the spring, whose minimum and maximum limits, notwithstanding rather wise constructional tolerances, afford a bearing with the required radial adjustment and whose characteristics will be maintained even in the event of wear or possible alterations in the parts due to breakdown or deformation.

Advantage can also be taken of the thin sheet metal sleeve for forming, by blanking and/or folding, flanges or tabs for axially retaining the bearing ring and the needles which could be contained in a cage. Such a possibility enables a ring which is devoid of radial flanges and consequently cheap to manufacture, to be employed. The tabs or flanges formed in the sleeve can also facilitate the construction of an incorporated sealing system maintaining the lubricant inside the bearing and protecting the latter from being soiled by matter from exterior.

Further features and advantages of the invention will be apparent from the ensuing description with reference to the accompanying drawing.

In the drawing:

FIG. 1 is a longitudinal sectional view of the assembly in a single housing of two bearings comprising a common sleeve;

FIG. 2 is a sectional view taken along line 2—2 of FIG. 1;

FIG. 3 is a partial view of a sheet metal blank from which the sleeve shown in FIGS. 1 and 2 is produced;

FIG. 4 is a sectional view taken along line 4—4 of FIG. 3;

FIG. 5 is a cross-sectional view of an extreme case in which the sleeve is coincident with the bearing ring, and FIG. 6 is a cross-sectional view of another embodiment of the bearing.

Each of the bearings 1 shown in FIG. 1 is interposed between a shaft A and a housing or support B. It comprises a thin steel ring 2 which initially has a cylindrical shape and is mounted inside a single sleeve 3 fitted in a bore 4 of the housing B. The sleeve 3 is produced by rolling a sheet metal blank, shown in FIGS. 3 and 4, which comprises, in the region of each annular row of needles 6 contained in a cage 7, two zones $a$ and $b$ which have, owing to a press operation, a permanent radial deformation imparting thereto the shape of a rectangular dish. These rectangular dished portions have relatively small dimensions so that their sidewalls 8 constitute, as it were, stiffening ribs and the zones $a$ and $b$ thus constitute rigid supports for the ring 2. It is advantageous that, by an appropriate construction of the press tool, the radial dimension $f$ between the support face 5 and the outer face $5^a$ of the ring which bears in the bore is constant and independent of the thickness of the metal sheet.

Two projecting portions $d$ and $e$, formed by a press operation in the sleeve 3 also in the region of each of the rows of needles 6 at equal angular distances from the dished portions $a$, $b$, constitute circumferential support faces for a spring strip 9 whose radius of curvature exceeds that of the ring 2 and which is radially urged in its middle portion in contact with the ring 2 thereby creating an elastically yieldable support or bearing face for the ring 2 which defines, with the rigid supports $a$, $b$, a system imparting in the three corresponding zones $p$, $q$, $r$ of the ring elastically yieldable deformations which reduce, or render negative, the annular clearance provided for the circulation of the needles 6 between the raceways 11 and 12 which are respectively formed on the inner face of the ring 2 and on the outer face of the shaft A.

To maintain the flangeless rings 2 in lateral position, lugs 13 and 14 are formed in the sleeve 3 by cutting and/or folding the sheet metal blank shown in FIGS. 3 and 4.

In FIG. 5, the outer raceway 11 for the needle 6 is formed directly in the inner face of the sleeve 3 within the wall of which is also formed the spring strip 19 which is radially urged into contact with the needles 6. Moreover, there could be provided in the middle of the cylindrical segment 19 of the sleeve 3 a portion of increased thickness which serves to reduce the clearance for the circulation of the needles as shown in FIG. 3 of U.S. Pat. No. 3,009,748.

FIG. 6 shows an arrangement intermediate between that shown in FIG. 2 and that shown in FIG. 5. The spring determining the elastic pressure of the sleeve producing the deformation of the ring 2 is constituted by a segment 29 of the sleeve 3 which has a large angular development and exerts radial pressure on the ring 2 in the center of the segment.

Preferably, the ends of the sheet metal blank are not welded after rolling so that the sleeve 3 remains split at 16 so that it is able to adapt itself, with no precise tolerance, in the bore 4 of the support which, for certain applications, such as electric machines, must be produced with a relatively high precision having regard to the conditions of economy of the contemplated application.

Although specific embodiments of the invention have been described, many modifications and changes may be made therein without departing from the scope of the invention.

Having now described my invention what I claim and desire to secure by Letters Patent is:

1. A rolling bearing comprising an axis of rotation, rolling members, a thin ring defining a raceway, a support defining a bore, a sleeve coaxial with said ring and engaging said bore, said sleeve having a thin wall which has two radially inwardly offset dish-shaped portions which constitute rigid supports and radially bear on said ring in two circumferentially spaced zones of said ring, means defining an elastically yieldable prestressed arcuate support having a concave face facing said ring, said yieldable support having two end portions in radially spaced relation to said ring and an intermediate portion which is in contact with said ring in a third zone of said ring opposite said two zones relative to said axis, and means for radially supporting said end portions so that said intermediate portion elastically supports said ring in said third zone, said ring being radially inwardly and resiliently deformed in said three zones so that clearance for the passage of said rolling members is reduced in said three zones.

2. A bearing as claimed in claim 1, wherein the pressed dish-shaped portion have a substantially constant dimension, between a face thereof forming the support for the ring and a face thereof bearing in the bore, irrespective of the thickness of the sleeve wall.

3. A rolling bearing comprising an axis of rotation, rolling members, a thin ring defining a raceway, a support defining a bore, a sleeve coaxial with said ring and engaging said bore, said sleeve having a thin wall which has two radially inwardly offset dish-shaped portions which constitute rigid supports and radially bear on said ring in two circumferentially spaced zones of said ring, means defining an elastically yieldable prestressed arcuate support having a concave face facing said ring, said yieldable support having two end portions in radially spaced relation to said ring and an intermediate portion which is in contact with said ring in a third zone of said ring opposite said two zones relative to said axis, and means for radially supporting said end portions so that said intermediate portion elastically supports said ring in said third zone, said ring being radially inwardly and resiliently deformed in said three zones so that clearance for the passage of said rolling members is reduced in said three zones, said elastically yieldable support being constituted by a segment portion of said sleeve, said end portions bearing directly against the bore.

4. A bearing as claimed in claim 3, wherein the thickness of the wall of the segment portion varies within its circumferential extent.

5. A bearing as claimed in claim 3, wherein the segment portion has mechanical properties which have been modified by a selective heat treatment.

6. A bearing as claimed in claim 1, wherein the elastically yieldable support is constituted by a curved strip constituting a spring which is separate from the sleeve and bears circumferentially on two radial projections on the sleeve.

7. A bearing as claimed in claim 6, wherein the strip is highly elastic due in particular to its great circumferential extent.

8. A bearing as claimed in claim 7, wherein said strip has an angular extent of substantially 90° relative to the axis of the bearing.

9. A bearing as claimed in claim 1, wherein the ring of the bearing is flangeless and the sleeve comprises radial lugs which axially retain the ring and the rolling members.

10. A bearing as claimed in claim 9, comprising a cage containing said rolling members.

11. A bearing as claimed in claim 9, wherein the lugs are bent portions of the sleeve which is a rolled sheet.

12. A bearing as claimed in claim 9, wherein the lugs are bent portions of the sleeve which is a rolled sheet.

13. A bearing as claimed in claim 1, wherein the sleeve is a rolled thin metal sheet.

14. A bearing as claimed in claim 13, wherein the sleeve has a longitudinal throughway slot allowing it to elastically adapt itself to the bore of the bearing.

15. A structure comprising a shaft having an axis of rotation; a support defining a bore; and two rolling bearings interposed between said shaft and said bore; each rolling bearing comprising rolling members, a thin ring defining a raceway for the rolling members, a sleeve coaxial with said ring and engaging said bore, said sleeve having a thin wall which has two radially inwardly offset dish-shaped portions which constitute rigid supports and radially bear on said ring in two circumferentially spaced zones of said ring, means defining an elastically yieldable prestressed arcuate support having a concave face facing said ring, said yieldable support having two end portions in radially spaced relation to said ring and an intermediate portion which is in contact with said ring in a third zone of said ring opposite said two zones relative to said axis, and means for radially supporting said end portions so that said intermediate portion elastically supports said ring in said third zone, said ring being radially inwardly and resiliently deformed in said three zones so that clearance for the passage of said rolling members is reduced in said three zones, said sleeve of one of said rolling bearings being common to the sleeve of the other of said rolling bearings.

* * * * *

UNITED STATES PATENT OFFICE
CERTIFICATE OF CORRECTION

Patent No. 3,630,586          Dated December 28, 1971

Inventor(s) ALFRED PITNER

It is certified that error appears in the above-identified patent and that said Letters Patent are hereby corrected as shown below:

In the heading of the patent item "[73]" should read as follows:

--[73] Assignee     NADELLA
                             RUEIL-MALMAISON, FRANCE
                             Undivided one-half interest--

Signed and sealed this 23rd day of April 1974.

(SEAL)
Attest:

EDWARD M. FLETCHER, JR.             C. MARSHALL DANN
Attesting Officer                    Commissioner of Patents